United States Patent
Ashibe et al.

(10) Patent No.: US 12,367,028 B2
(45) Date of Patent: Jul. 22, 2025

(54) ON-BOARD DEVICE, INFORMATION PROCESSING METHOD, AND COMPUTER PROGRAM PRODUCT

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kentaro Ashibe, Yokkaichi (JP); Tatsuya Izumi, Osaka (JP); Ichiro Kanda, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 337 days.

(21) Appl. No.: 17/995,536

(22) PCT Filed: Mar. 16, 2021

(86) PCT No.: PCT/JP2021/010612
§ 371 (c)(1),
(2) Date: Oct. 5, 2022

(87) PCT Pub. No.: WO2021/205825
PCT Pub. Date: Oct. 14, 2021

(65) Prior Publication Data
US 2023/0195445 A1    Jun. 22, 2023

(30) Foreign Application Priority Data
Apr. 8, 2020   (JP) ................. 2020-069814

(51) Int. Cl.
*G06F 8/65* (2018.01)
*B60R 16/023* (2006.01)

(52) U.S. Cl.
CPC .............. *G06F 8/65* (2013.01); *B60R 16/023* (2013.01)

(58) Field of Classification Search
None
See application file for complete search history.

(56) References Cited

U.S. PATENT DOCUMENTS

| 8,560,823 B1 * | 10/2013 | Aytek | G06F 8/654 |
| | | | 713/2 |
| 2017/0093866 A1 * | 3/2017 | Ben-Noon | H04W 12/068 |

(Continued)

FOREIGN PATENT DOCUMENTS

| JP | 2011-148398 A | 8/2011 |
| JP | 2015-144008 A | 8/2015 |
| JP | 6528700 B2 | 8/2019 |

OTHER PUBLICATIONS

International Search Report, Application No. PCT/JP2021/010612, mailed Jun. 8, 2021. ISA/Japan Patent Office.

*Primary Examiner* — Andrew M. Lyons
(74) *Attorney, Agent, or Firm* — Honigman LLP (57) ABSTRACT

An on-board device includes a processing unit, and a storage unit storing a plurality of programs that are executable by the processing unit, in which the processing unit acquires information relevant to the presence or absence of update that is provided from a server outside a vehicle, stores the acquired information relevant to the presence or absence of the update in a sharing area by executing an input/output function that is different from an input/output function included in a basic program, and selectively executes the basic program or an update processing program after starting execution of a boot (Continued)

program, on the basis of the stored information relevant to the presence or absence of the update.

9 Claims, 4 Drawing Sheets

(56) References Cited

U.S. PATENT DOCUMENTS

| | | | |
|---|---|---|---|
| 2017/0139778 A1 | 5/2017 | Kito et al. | |
| 2018/0232246 A1* | 8/2018 | Nakabayashi | G06F 21/57 |
| 2019/0283692 A1* | 9/2019 | Kontani | H04B 3/36 |
| 2020/0167307 A1 | 5/2020 | Okada | |
| 2020/0356357 A1* | 11/2020 | Narasimhan | G06F 15/167 |
| 2022/0179641 A1* | 6/2022 | Harata | B60R 16/02 |

* cited by examiner

ON-BOARD DEVICE, INFORMATION PROCESSING METHOD, AND COMPUTER PROGRAM PRODUCT

CROSS-REFERENCE TO RELATED APPLICATIONS

This application is the U.S. national stage of PCT/JP2021/010612 filed on Mar. 16, 2021, which claims priority of Japanese Patent Application No. JP 2020-069814 filed on Apr. 8, 2020, the contents of which are incorporated herein.

TECHNICAL FIELD

The present disclosure relates to an on-board device, an information processing method, and a computer program.

BACKGROUND

An on-board electronic control unit (ECU) for controlling an on-board device such as a powertrain system of engine control or the like, and a body system of air conditioner control or the like is mounted on a vehicle. The on-board ECU includes an arithmetic processing unit such as MPU, a rewritable non-volatile storage unit such as RAM, and a communication unit for communicating with other on-board ECUs, and controls the on-board device by reading and executing a control program stored in a storage unit. Further, the vehicle is equipped with a relay device having a wireless communication function, and thus, is capable of communicating with a program providing device to be connected to a network outside the vehicle through the relay device, of downloading (receiving) the control program of the on-board ECU from the program providing device, and of updating the control program of the on-board ECU (for example, refer to Japanese Patent Laid-Open Publication No. 2017-97851).

In the relay device of Japanese Patent Laid-Open Publication No. 2017-97851, the matters relevant to processing of updating a control program that is executed by an own device are not considered, and thus, there is a concern that it is not possible to efficiently update the control program of the own device.

An object of the present disclosure is to provide an on-board device in which it is possible to efficiently update a control program of an own device.

An on-board device according to one aspect of the present disclosure is an on-board device, including: a processing unit; and a storage unit storing a plurality of programs that are executable by the processing unit, in which the plurality of programs include a boot program to be executed when activating the processing unit, a basic program to be selectively executed by the boot program, and an update processing program to be selectively executed by the boot program to perform communication of information relevant to update of a server outside a vehicle, the storage unit includes a sharing area for storing information relevant to the presence or absence of update of a control program of the on-board device, the sharing area is being accessible by executing the boot program and is different from an area accessible by an input/output function included in the basic program, and the processing unit acquires the information relevant to the presence or absence of the update that is provided from the server outside the vehicle, stores the acquired information relevant to the presence or absence of the update in the sharing area by an input/output function that is different from the input/output function included in the basic program, and executes the basic program or the update processing program after starting execution of the boot program, on the basis of the stored information relevant to the presence or absence of the update.

Advantageous Effects

According to one aspect of the present disclosure, it is possible to efficiently update a control program of an own device.

BRIEF DESCRIPTION OF THE DRAWINGS

FIG. 2 is a block diagram illustrating a configuration of the relay device or the like.

DETAILED DESCRIPTION OF PREFERRED EMBODIMENTS

First, embodiments of the present disclosure will be listed and described. In addition, at least a part of the embodiments to be described below may be arbitrarily combined.

First Aspect

An on-board device according to a first aspect of the present disclosure is an on-board device, including: a processing unit; and a storage unit storing a plurality of programs that are executable by the processing unit, in which the plurality of programs include a boot program to be executed when activating the processing unit, a basic program to be selectively executed by the boot program, and an update processing program to be selectively executed by the boot program to perform communication of information relevant to update with a server outside a vehicle, the storage unit includes a sharing area for storing information relevant to the presence or absence of update of a control program of the on-board device, the sharing area is being accessible by executing the boot program and is different from an area accessible by an input/output function included in the basic program, and the processing unit acquires the information relevant to the presence or absence of the update that is provided from the server outside the vehicle, stores the acquired information relevant to the presence or absence of the update in the sharing area by an input/output function that is different from the input/output function included in the basic program, and executes the basic program or the update processing program after starting execution of the boot program, on the basis of the stored information relevant to the presence or absence of the update.

In the first aspect, the plurality of programs including the boot program, the basic program, the update processing program, the control program to be executed on the basic program, and the like are stored in the storage unit of the on-board device. The processing unit of the on-board device executes processing on the basis of control contents that are different for each program to be executed, and access authority. The processing unit executing the boot program decides whether to select the basic program or the update processing program to activate by identifying the information relevant to the presence or absence of the update that is provided from the server outside the vehicle and is stored in the storage unit. In a case where there is the information relevant to the update, the processing unit stores an identifier indicating that there is the information relevant to the update in the sharing area that is configured to be accessible by the processing unit executing the boot program without using the basic program. Even before starting the execution of the basic program, the information relevant to the presence or absence of the update is acquired by the processing unit executing the boot program, and thus, a program to be executed in a boot phase can be determined, and the program can be efficiently updated on the basis of the update processing program that is selectively activated in accordance with a determination result. The sharing area is set to a dedicated area that is not accessible by the processing unit executing the basic program and stores only the information relevant to the presence or absence of the update, and thus, efficient processing is executed while preventing the occurrence of a conflict by a simple configuration.

Second Aspect

In the on-board device according to a second aspect of the present disclosure, the plurality of programs include the control program and a diagnostic program to be executed on the basic program, the diagnostic program includes an input/output function that is different from the input/output function included in the basic program, the processing unit executing the control program controls relay with a plurality of on-board ECUs connected by communication, and the processing unit executing the diagnostic program acquires the information relevant to the presence or absence of the update that is provided from the server outside the vehicle, and stores the acquired information relevant to the presence or absence of the update in the sharing area by the input/output function that is different from the input/output function included in the basic program.

In the second aspect, the control program and the diagnostic program are executed in parallel by using the basic program as a platform, and thus, the on-board device is capable of executing efficient update processing while having a function as, for example, a gateway.

Third Aspect

In the on-board device according to a third aspect of the present disclosure, the processing unit designates the sharing area by a physical address indicating a physical storage position in the storage unit, and stores the information relevant to the presence or absence of the update in the designated sharing area.

In the third aspect, the information relevant to the presence or absence of the update is stored in the sharing area that is directly designated by the physical address. Accordingly, the sharing area can be referred to by other programs without controlling the input/output function included in the basic program, and the processing can be efficiently executed.

Fourth Aspect

In the on-board device according to a fourth aspect of the present disclosure, the sharing area is accessible by executing the update processing program, and when update processing is completed, the processing unit executing the update processing program stores information indicating that the update processing is completed in the sharing area.

In the fourth aspect, in a case where the update processing is completed, the information indicating the completion of the update is stored in the sharing area by the update processing program. The sharing area is configured to be accessible by the processing unit executing the update processing program without using the basic program, and thus, the processing can be efficiently executed.

Fifth Aspect

An information processing method according to a fifth aspect of the present disclosure is an information processing method, including: boot processing to be executed when activated; basic processing to be selectively executed by the boot processing; and update processing to be selectively executed by the boot processing to perform communication of information relevant to update with a server outside a vehicle, a sharing area for storing information relevant to the presence or absence of update of a control program of an own device is being accessible by executing the boot processing and is different from an area accessible by an input/output function included in the basic processing, the method allowing a computer to execute processing of: acquiring the information relevant to the presence or absence of the update that is provided from the server outside the vehicle; storing the acquired information relevant to the presence or absence of the update in the sharing area by an input/output function that is different from the input/output function included in the basic processing; and executing the basic processing or the update processing after starting execution of the boot processing, on the basis of the stored information relevant to the presence or absence of the update.

In the fifth aspect, the control program of the own device can be efficiently updated.

Sixth Aspect

A computer program according to a sixth aspect of the present disclosure is a computer program, including: a boot program to be executed when activated; a basic program to be selectively executed by the boot program; and an update processing program to be selectively executed by the boot program to perform communication of information relevant to update with a server outside a vehicle, a sharing area for storing information relevant to the presence or absence of update of a control program of an own device is being accessible by executing the boot program and is different from an area accessible by an input/output function included in the basic program, the program allowing a computer to execute processing of: acquiring the information relevant to the presence or absence of the update that is provided from the server outside the vehicle; storing the acquired information relevant to the presence or absence of the update in the sharing area by an input/output function that is different from the input/output function included in the basic program; and executing the basic program or the update processing program after starting execution of the boot program, on the basis of the stored information relevant to the presence or absence of the update.

In the sixth aspect, the control program of the own device can be efficiently updated.

Hereinafter, specific examples of a relay device according to an embodiment of the present disclosure will be described with reference to the drawings. Note that, the present disclosure is not limited to such examples, but is indicated by the claims and is intended to include the meaning equivalent to the claims and all changes in the claims.

Figure 1:
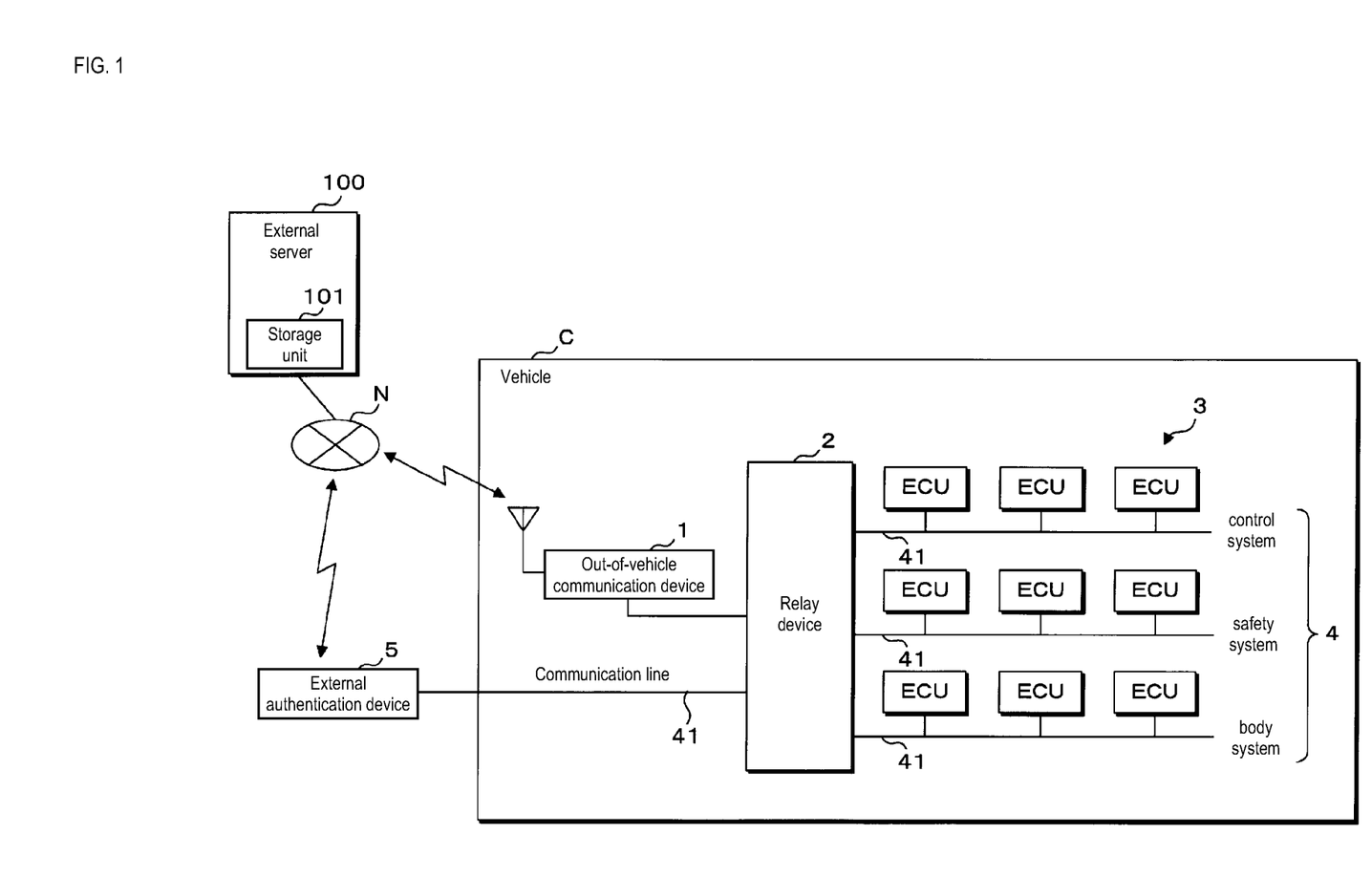
FIG. 1 is a schematic view illustrating a configuration of an on-board system including a relay device (an on-board device) according to this embodiment.
Figure 2:
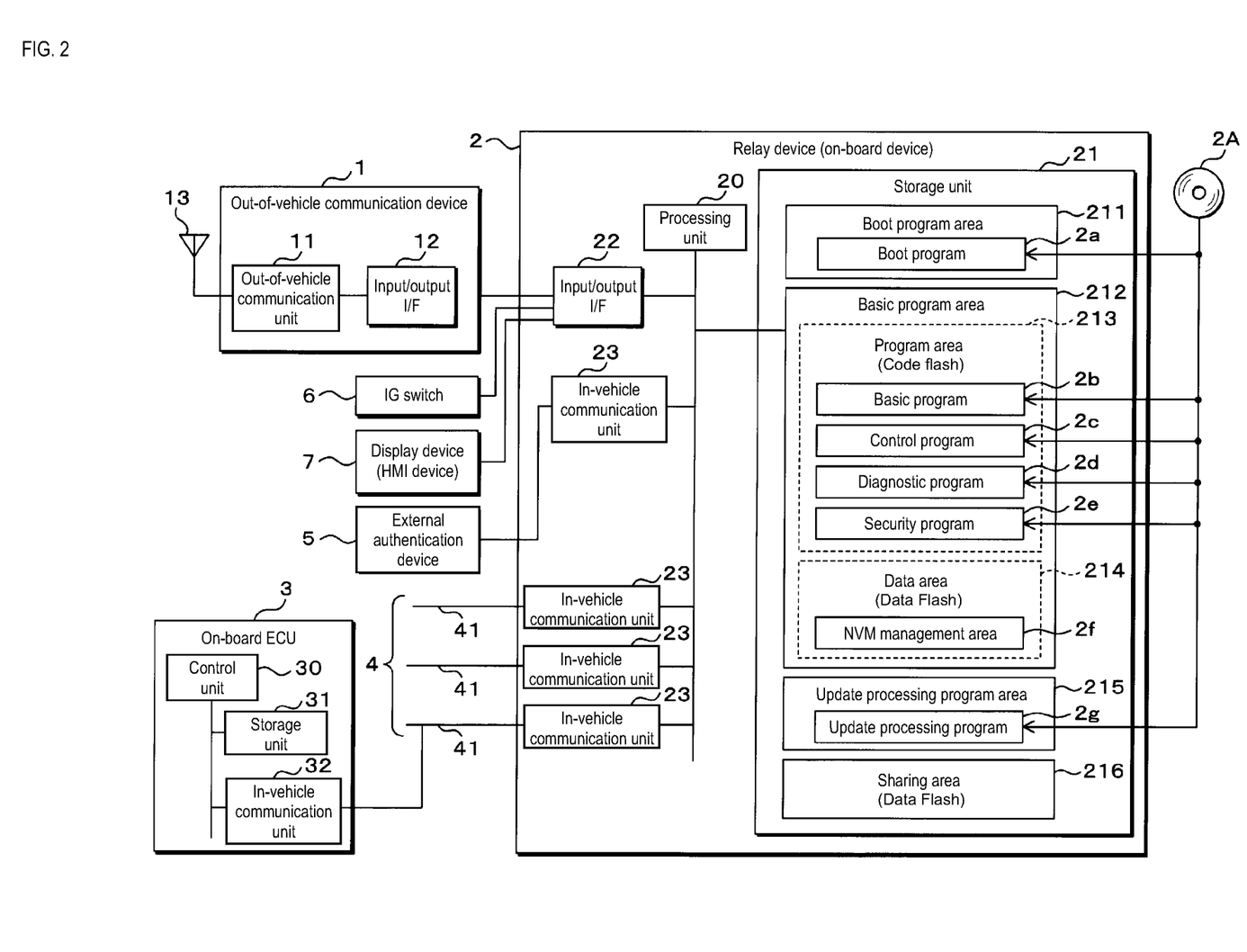

FIG. 1 is a schematic view illustrating the configuration of an on-board system including a relay device (an on-board device) 2 according to this embodiment. FIG. 2 is a block diagram illustrating the configuration of the relay device or the like. The on-board system includes an out-of-vehicle communication device 1 that is mounted on a vehicle C, the relay device 2, and an external server 100. In this embodiment, the relay device 2 corresponds to an on-board device storing a boot program 2a, a basic program 2b, an update processing program 2g, and the like. The relay device 2 acquires a program or data from the external server 100 connected through a network N outside the vehicle, and transmits the program or the data to an on-board electronic control unit (ECU) 3 that is mounted on the vehicle C. In addition, in a case where an external authentication device 5 is connected to the vehicle C, the external authentication device 5 communicates with the external server 100 through the network N outside the vehicle.

The external server 100, for example, is a computer such as a server that is connected to the network N outside the vehicle such as the internet or a public network, and includes a storage unit 101 such as a random access memory (RAM), a read only memory (ROM), or a hard disk. The storage unit 101 stores a program or data for controlling the relay device 2 that is created by a manufacturer or the like of the relay device 2. The program or the data is transmitted to the vehicle C as described below as an update program, and is used to update a control program 2c or data of the relay device 2 mounted on the vehicle C. The external server 100 configured as described above is also referred to as an over the air (OTA) server. The relay device 2 mounted on the vehicle C acquires the update program that is transmitted from the external server 100 by wireless communication, and applies the update program as the control program to be executed, and thus, is capable of updating (reproducing) the control program that is executed by an own device. The storage unit 101 of the external server 100 stores configuration information of the relay device 2 that is transmitted from the external authentication device 5. The configuration information includes identification information (vehicle identification number: VIN) for identifying the vehicle C. The external server 100 specifies the vehicle C on the basis of the identification information, and performs communication relevant to the configuration information of the relay device 2 of the vehicle C with the specified vehicle C.

The out-of-vehicle communication device 1, the relay device 2, a display device 7, and a plurality of on-board ECUs 3 for controlling various on-board devices are mounted on the vehicle C. The out-of-vehicle communication device 1 and the relay device 2, for example, are connected by a harness such as a serial cable such that communication can be performed. The relay device 2 and the on-board ECU 3 are connected by a communication line 41 and an in-vehicle LAN 4 corresponding to a communication protocol such as Control Area Network (CAN: Registered Trademark) or Ethernet (Registered Trademark) such that communication can be performed.

The out-of-vehicle communication device 1 includes an out-of-vehicle communication unit 11 and an input/output interface (I/F) 12 for communicating with the relay device 2. The out-of-vehicle communication unit 11 is a communication device for wireless communication using a mobile communication protocol such as 3G, LTE, 4G, 5G, and WiFi, and transmits and receives data with respect to the external server 100 through an antenna 13 that is connected to the out-of-vehicle communication unit 11. The communication between the out-of-vehicle communication device 1 and the external server 100, for example, is performed through the network N outside the vehicle such as a public network or the internet.

The input/output I/F 12, for example, is a communication interface for serial communication with the relay device 2. The out-of-vehicle communication device 1 and the relay device 2 communicate with each other through the input/output I/F 12 and a harness such as a serial cable that is connected to the input/output I/F 12. In this embodiment, the out-of-vehicle communication device 1 is a separate device from the relay device 2, and connects the devices by the input/output I/F 12 or the like such that communication can be performed, but is not limited thereto. The out-of-vehicle communication device 1 may be built in the relay device 2 as one component of the relay device 2.

As illustrated in FIG. 2, the relay device 2 includes a processing unit 20, a storage unit 21, an input/output I/F 22, an in-vehicle communication unit 23, and the like. The relay device 2, for example, controls segments of systems, such as the on-board ECU 3 of a control system, the on-board ECU 3 of a safety system, and the on-board ECU 3 of the body system, by a plurality of communication lines 41, and relays communication in the on-board ECUs 3 between the segments. The relay device 2, for example, is a gateway or an Ether-switch. The relay device 2, for example, may be configured as one function unit of a body ECU controlling the entire vehicle C, an automated driving ECU controlling automated driving, or the like.

The processing unit 20 includes a central processing unit (CPU), a micro processing unit (MPU), or the like. The processing unit 20 reads out and executes each of programs and data pieces stored in advance in the storage unit 21, and performs various control processings, arithmetic processings, and the like. Note that, hereinafter, a program and data required for executing the program can be included in the term of "program".

The storage unit 21 includes a volatile memory element such as a random access memory (RAM), or a non-volatile memory element such as a read only memory (ROM), an electrically erasable programmable ROM (EEPROM), or a flash memory. The storage unit 21 includes a boot program area 211, a basic program area 212, an update processing program area 215, a sharing area 216, and the like.

In the boot program area 211, the boot program 2a is stored. The boot program 2a is a program to be first activated after the relay device 2 is reset. The processing unit 20 performs processing of selectively activating either the basic program 2b or the update processing program 2g described below, in accordance with information relevant to the presence or absence of update that is stored in the sharing area 216, by executing the boot program 2a. The information relevant to the presence or absence of the update is information indicating whether or not there is information relevant to the update program in the external server 100. The information relevant to the presence or absence of the update, for example, includes an update flag indicating that there is the information relevant to the update, a completion flag indicating that there is no information relevant to the update, and the like. In a case where there is the update flag, the processing unit 20 activates the update processing program 2g. In a case where there is the completion flag, the processing unit 20 activates the basic program 2b. The boot program 2a may be ended after the processing of activating the update processing program 2g or the basic program 2b is executed.

In the update processing program area 215, the update processing program 2g is stored. The update processing program 2g is a program for executing update processing of updating the control program 2c to be updated to the update program in a case where the update program is provided from the external server 100. The processing unit 20 performs the communication of the information relevant to the update of the control program 2c described below with the external server 100 through the out-of-vehicle communication device 1, and performs the update processing of acquiring the update program from the external server 100, by executing the update processing program 2g. The acquired update program is stored in the basic program area 212. In a case where the update processing is completed, the processing unit 20 stores an identifier indicating that the update processing is completed in the sharing area 216.

The basic program area 212 includes a program area (code flash) 213 and a data area (data flash) 214. In the program area 213, the basic program 2b, the control program 2c to be executed on the basic program 2b, a diagnostic program 2d, a security program 2e, and the like are stored. The data area 214 includes a NVM management area 2f that is managed by an input/output function (NVM) included in the basic program 2b. The basic program 2b is a computer program according to an operating system. The basic program 2b, for example, may be based on a standard of automotive open system architecture (AUTOSAR).

All of the control program 2c, the diagnostic program 2d, and the security program 2e are a program to be executed by using the basic program 2b as a platform.

The control program 2c is a program to be executed in a state where the update processing based on the update processing program 2g is not performed, and for example, relays the communication between the on-board ECUs 3 or between the external server 100 and the on-board ECU 3. The control program 2c is to be updated by the update program that is transmitted from the relay device 2. The processing unit 20, for example, relays a CAN message, an IP packet, or the like that is transmitted from the on-board ECU 3, with reference to relay route information (a routing table) stored in the storage unit 21, by executing the control program 2c.

The diagnostic program 2d is a program to be executed in parallel with the control program 2c, and monitors the presence or absence of the information relevant to the update program. The processing unit 20 performs the communication with the external server 100 using the out-of-vehicle communication device 1, and periodically queries whether or not there is the information relevant to the update of the control program 2c mounted on the vehicle C, by executing the diagnostic program 2d. In a case where there is the information relevant to the update, the processing unit 20 stores an identifier indicating that there is an update request in the sharing area 216. Note that, the diagnostic program 2d is not limited to the program to be executed in parallel with the control program 2c. For example, the diagnostic program 2d may be configured as one module included in the control program 2c, and may be executed as a sub-process of the process of the control program 2c.

The security program 2e is a program to be executed in parallel with the control program 2c and the diagnostic program 2d, and manages security information in the control program 2c and the diagnostic program 2d.

In the above description, an example has been described in which the control program 2c, the diagnostic program 2d, and the security program 2e to be executed on the basic program 2b are configured as different program modules, respectively, but this embodiment is not limited. For example, the control program 2c, the diagnostic program 2d, and the security program 2e may be configured to be included in the basic program 2b as a part of the function of the basic program 2b.

As the boot program 2a, the basic program 2b, the control program 2c, the diagnostic program 2d, the security program 2e, and the update processing program 2g, described above, which are stored in the storage unit 21, the boot program 2a, the basic program 2b, the control program 2c, the diagnostic program 2d, the security program 2e, and the update processing program 2g, which are read out from a recording medium 2A that is readable by the relay device 2, may be stored, respectively. In addition, the boot program 2a, the basic program 2b, the control program 2c, the diagnostic program 2d, the security program 2e, and the update processing program 2g may be respectively downloaded from an external computer (not illustrated) connected to a communication network (not illustrated) and stored in the storage unit 21. Further, the storage unit 21 stores the configuration information of the own relay device 2 and all of the on-board ECUs 3 mounted on the vehicle C.

The NVM management area 2f is a data storage area that is managed by the input/output function (a memory management function) included in the basic program 2b. The processing unit 20 executing the basic program 2b accesses the NVM management area 2f by using the input/output function of converting a logical address to a physical address in processing based on the basic program 2b, and stores data. That is, the processing unit 20 executing the basic program 2b stores conversion information to be converted in association with the logical address and the physical address by the input/output function, and stores data in the NVM management area 2f specified with reference to the conversion information. Accordingly, an access to the NVM management area 2f from the processing unit 20 executing other programs not including the input/output function that is included in the basic program 2b is limited. That is, in a case where the boot program 2a and the update processing program 2g are executed, the processing unit 20 is not capable of referring to the information of the NVM management area 2f. Input/output processing is executed with respect to the NVM management area 2f configured as described above by using the input/output function included in the basic program 2b, and thus, the processing unit 20 executes read and write of data, sound, and the like with respect to the NVM management area 2f.

The sharing area (data flash) 216 is an area dedicated for an identifier in which only an identifier indicating the information relevant to the presence or absence of the update is stored. The identifier indicating the information relevant to the presence or absence of the update, for example, may include the update flag, the completion flag, or the like, described above. The sharing area 216 is a data storage area that is not managed by the input/output function included in the basic program 2b, and is a storage area in which a location can be uniquely designated by using the physical address. The processing unit 20 executing the input/output function included in the basic program 2b is not capable of accessing the sharing area 216. In a case where the information relevant to the presence or absence of the update is identified or in a case where the update processing is completed, the processing unit 20 executing the diagnostic program 2d and the update processing program 2g stores an identifier according to such a result in the sharing area 21b. In this case, the processing unit 20 designates the sharing area 21b by using the physical address that is physical position information in the non-volatile memory of the storage unit 21, and stores the identifier in the sharing area 21b. That is, the processing unit 20 executing the diagnostic program 2d or the update processing program 2g accesses the sharing area 21b and stores data by input/output function of directly designating the physical address, which is different from the input/output function of the basic program 2b of performing the conversion processing of associating the logical address with the physical address.

As described above, the storage unit 21 includes the sharing area 21b that is not managed by the input/output function included in the basic program 2b, and thus, the sharing area 21b can be directly accessed from the processing unit 20 executing other programs without executing the basic program 2b. Even in a case where the processing unit 20 executes processing on the basis of the boot program 2a, it is possible to directly access the sharing area 21b and to recognize the identifier indicating the information relevant to the presence or absence of the update without activating the basic program 2b, and it is possible to efficiently perform the subsequent activation processing.

As with the input/output I/F 12 of the out-of-vehicle communication device 1, the input/output I/F 22, for example, is a communication interface for serial communication. The relay device 2 is connected to the out-of-vehicle communication device 1 and an IG switch 6 through the input/output I/F 22 such that communication can be performed.

The in-vehicle communication unit 23, for example, is an input/output interface using a communication protocol such as Control Area Network (CAN) or Ethernet (Ethernet/Registered Trademark), and the processing unit 20 communicates with the on-board ECU 3 connected to the in-vehicle LAN 4 or other on-board devices such as the relay device through the in-vehicle communication unit 23. There are a plurality of in-vehicle communication units 23, and the communication line 41 configuring the in-vehicle LAN 4 is connected to each of the in-vehicle communication units 23. By providing the plurality of in-vehicle communication units 23, the in-vehicle LAN 4 is divided into a plurality of segments, and connects the on-board ECU to each of the segments in accordance with the function of the on-board ECU (a control system function, a safety system function, and a body system function). The external authentication device 5 described below is connected to the in-vehicle communication unit 23 as necessary, and in a case where the external authentication device 5 is connected, the processing unit 20 communicates with the external authentication device 5 through the in-vehicle communication unit 23.

The on-board ECU 3 includes a control unit 30, a storage unit 31, and an in-vehicle communication unit 32. The storage unit 31 includes a volatile memory element such as RAM, or a non-volatile memory element such as ROM, EEPROM, or a flash memory, and stores the program or the data of the on-board ECU 3. The control unit 30 includes CPU, MPU, or the like, performs control processing or the like by reading out and executing the program and the data stored in the storage unit 31, and controls the on-board device including the on-board ECU 3, an actuator, or the like.

The external authentication device 5 is a device (a diagnostic tool) that is used by a maintenance operator of the vehicle C including a qualified dealer who is in charge of performing a maintenance operation of the vehicle C such as the replacement of the on-board ECU 3, or the like, and for example, is a device in which a dedicated application is installed in a general information terminal such as a personal computer, a tablet PC, or a smart phone, or a device configured as a dedicated information terminal including hardware. As with the on-board ECU 3 described above, the external authentication device 5 includes a control unit such as CPU or MPU, a storage unit, an in-vehicle communication unit (all are not illustrated), and the like. The in-vehicle communication unit of the external authentication device 5 is not limited to CAN or Ethernet similar to the on-board ECU 3, and for example, may be an input/output I/F or a communication module for communication using a wire harness such as a serial cable.

The external authentication device 5 communicates with the relay device 2 or each of the on-board ECU 3 by the in-vehicle communication unit through the in-vehicle LAN or the like. Alternatively, the in-vehicle communication unit of the external authentication device 5 may have a wireless communication function, and the external authentication device 5 may communicate with the relay device 2 by wireless communication. Further, the external authentication device 5 includes an out-of-vehicle communication unit (not illustrated) for communicating with the external server 100. The out-of-vehicle communication unit of the external authentication device 5 is a communication module having a wired or wireless communication function, and the external authentication device 5 communicates with the external server 100 by the out-of-vehicle communication unit through the network N outside the vehicle.

The ignition (IG) switch 6 for activating or stopping the vehicle C is connected to the input/output OF 22 of the relay device 2 by a wire harness such as a serial cable such that communication can be performed. In a case where the IG switch 6 is On or Off, the processing unit 20 of the relay device 2 acquires (receives) a signal output (transmitted) from the IG switch 6 through the input/output I/F 22. The processing unit 20 of the relay device 2 transmits information relevant to On or Off of the IG switch 6 (an IG-On signal or an IG-Off signal) to all of the on-board ECUs through the in-vehicle communication unit 23, on the basis of the acquired signal. In a case where the external authentication device 5 are connected to the vehicle C, the processing unit 20 of the relay device 2 also transmits the information relevant to On or Off of the IG switch 6 to the external authentication device 5. The on-board ECU 3 and the external authentication device 5 acquires the information relevant to On or Off of the IG switch 6 that is transmitted from the relay device 2, and performs a predetermined operation on the basis of the acquired information.

The display device 7, for example, is a human machine interface (HMI) device such as a car navigation display. The display device 7 is connected to the input/output I/F 22 of the relay device 2 by a harness such as a serial cable such that communication can be performed. The data or the information output from the processing unit 20 of the relay device 2 through the input/output I/F 22 is displayed on the display device 7.

Figure 3:
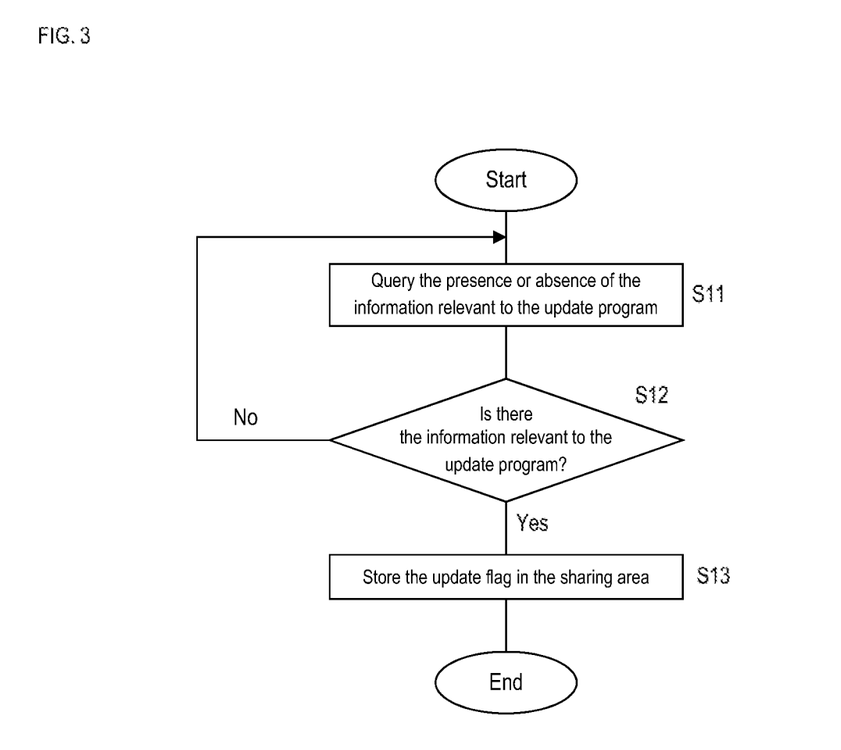
FIG. 3 is a flowchart illustrating a procedure of update flag storage processing that is performed by the relay device according to this embodiment.

FIG. 3 is a flowchart illustrating the procedure of update flag storage processing that is performed by the relay device 2 according to this embodiment. The processing unit 20 of the relay device 2, for example, constantly performs the following processing in a case where the vehicle C is in an activated state (the IG switch 6 is On) or in a stopped state (the IG switch 6 is Off).

The processing unit 20 of the relay device 2 communicates with the external server 100 through the out-of-vehicle communication device 1, and queries the presence or absence of the information relevant to the update program (step S11). The processing unit 20 determines whether there is the information relevant to the update program, such as campaign information, that is, whether or not there is the update request (step S12). The determination of whether or not there is the update request may be performed on the basis of not only pull communication such as the query from the relay device 2 to the external server 100, but also push communication such as the message transmitted from the external server 100 to the relay device 2. Note that, the query of the information relevant to the update program may be performed by connecting the external authentication device 5 to the in-vehicle communication unit 23.

In a case where it is determined that there is no information relevant to the update program by receiving a response indicating that there is no information relevant to the update program from the external server 100 (step S12: NO), the processing unit 20 performs loop processing to execute again the processing of S11. By performing the loop processing, the processing unit 20 periodically performs the query relevant to the update program with respect to the external server 100.

In a case where it is determined that there is the information relevant to the update program by receiving a response indicating that there is the information relevant to the update program from the external server 100 (step S12: YES), the processing unit 20 stores the update flag (for example, an identifier "1") indicating that there is the information relevant to the update program in the sharing area 216 (step S13), and ends the processing. In this case, the processing unit 20 directly designates the physical address that is the physical position information of the sharing area 216 without performing the conversion processing of associating the logical address with the physical address, and stores the update flag in the sharing area 216. That is, the processing unit 20 stores the update flag in the sharing area 216 by an input/output function that is different from the input/output function of the basic program 2b.

Figure 4:
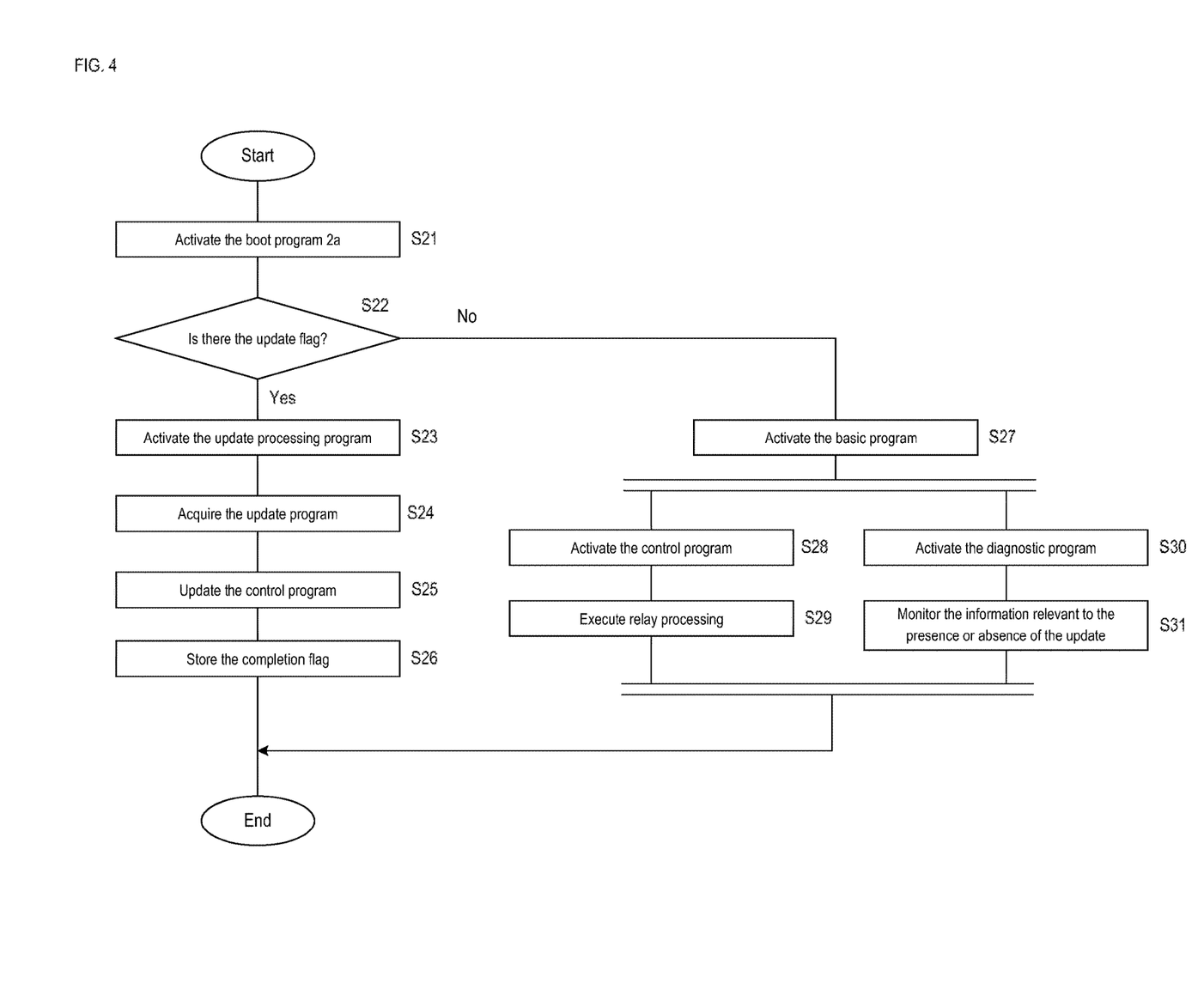
FIG. 4 is a flowchart illustrating a procedure of activation processing that is performed by the relay device according to this embodiment.

FIG. 4 is a flowchart illustrating the procedure of activation processing that is performed by the relay device 2 according to this embodiment. For example, in a case where a reset signal for instructing the reset of the vehicle C is acquired or the IG switch 6 is changed to the On state from the Off state or to the Off state from the On state, the following processing is executed by the processing unit 20 of the relay device 2.

The processing unit 20 decompresses the boot program 2a stored in the storage unit 21 on RAM, and activates the boot program 2a (step S21). The processing unit 20 determines whether or not there is the update flag, with reference to the sharing area 216 that is specified on the basis of the physical address (step S22). For example, in a case where the identifier "1" is stored in the sharing area 216, the processing unit 20 determines that there is the update flag. On the other hand, in a case where an identifier "0" is stored, the processing unit 20 determines that there is no update flag. The processing unit 20 specifies a program to be activated on the basis of the presence or absence of the update flag.

In a case where it is determined that there is the update flag (step S22: YES), the processing unit 20 determines to activate the update processing program 2g. The processing unit 20 selects and activates the update processing program 2g stored in the update processing program area 215 (step S23), and ends the processing of the boot program 2a.

The processing unit 20 proceeds to the processing based on the update processing program 2g. The processing unit 20 acquires the update program from the external server 100 through the out-of-vehicle communication device 1 (step S24). The processing unit 20 may acquire the update program from the external authentication device 5 through the in-vehicle communication unit 23.

The processing unit 20 executes the update processing of updating the control program 2c to the acquired update program, that is, the new control program 2c (step S25). Specifically, the processing unit 20 executes the update processing of deleting the control program 2c stored in the program area, of newly storing the acquired update program, and of applying the update program. Alternatively, in a case where two areas are provided in the program area of the storage unit 21, the processing unit 20 may store the acquired update program in an area that is different from an area for storing the control program 2c to be updated. The processing unit 20 executes the update processing by switching the area of the storage unit 21 from which the control program 2c to be applied is read out to the area for storing the update program from the area for storing the previous control program 2c.

In a case where the new control program 2c is applied, and the update processing is normally completed, the processing unit 20 resets the flag stored in the sharing area 216. The processing unit 20, for example, stores the completion flag (for example, the identifier "0") indicating that the update processing is completed, that is, the information relevant to the update is suitably stored and there is no information relevant to the update in the sharing area 216 (step S26), and ends the processing of the update processing program 2g. Even in this case, the processing unit 20 directly designates the physical address that is the physical position information of the sharing area 216 without performing the conversion processing of associating the logical address with the physical address, and stores the completion flag in the sharing area 216. That is, the processing unit 20 stores the completion flag in the sharing area 216 by the input/output function that is different from the input/output function of the basic program 2b.

On the other hand, in a case where it is determined that there is no update flag (step S22: NO), the processing unit 20 determines to activate the basic program 2b. The processing unit 20 selects and activates the basic program 2b stored in the program area 213 (step S27), and ends the processing of the boot program 2a.

The processing unit 20 proceeds to the processing based on the basic program 2b. The processing unit 20 activates the control program 2c on the basic program 2b (step S28), and starts the processing based on the control program 2c. The processing unit 20, for example, executes relay processing of relaying the CAN message, the IP packet, or the like that is transmitted from the on-board ECU 3 (step S29), and ends the processing of the control program 2c and the basic program 2b.

The processing unit 20 generates the sub-process, and performs the processing of step S30 in parallel with the subsequent processing of step S28. The processing unit 20 activates the diagnostic program 2d on the basic program 2b (step S30), and starts the processing based on the diagnostic program 2d. As illustrated in FIG. 3, the processing unit 20 executes processing of monitoring the information relevant to the presence or absence of the update (step S31), and ends the processing of the diagnostic program 2d and the basic program 2b. Note that, the processing unit 20 may further generate the sub-process, and may execute processing of activating the security program 2e in parallel with step S28 and step S30.

According to this embodiment, the information relevant to the presence or absence of the update can be stored in the sharing area 216 that is configured to be commonly accessible by the processing unit 20 executing a plurality of programs. The processing unit 20 is capable of specifying the program to be activated with reference to the information relevant to the presence or absence of the update that is stored in the sharing area 216 by the function of the boot program, and thus, is capable of efficiently updating the control program 2c of the own device.

The embodiments disclosed as described above are an example in all respects and are not restrictive. The scope of the present disclosure is indicated by the claims and includes the meaning equivalent to the claims and all modifications within the claims.

The invention claimed is:

1. A relay device electrically coupled to at least two communication lines, each of the at least two communication lines including at least one electronic control unit, the relay device configured to relay between each of the at least one electronic control unit, the relay device comprising:
   a processing unit; and
   a storage unit storing a plurality of programs that are executable by the processing unit,
   wherein the plurality of programs include
   a boot program to be executed when activating the processing unit,
   a basic program to be selectively executed by the boot program, the basic program configured to perform relay processing between each one of the at least one electronic control unit, and
   an update processing program to be selectively executed by the boot program to perform communication of information relevant to an update,
   the storage unit includes a sharing area for storing information relevant to the presence or absence of update of a control program of the on-board device,
   the sharing area is accessible by executing the boot program and is different from an area accessible by an input/output function included in the basic program, and
   the processing unit
   acquires the information relevant to the presence or absence of the update that is provided,
   stores the acquired information relevant to the presence or absence of the update in the sharing area by an input/output function that is different from the input/output function included in the basic program, and
   executes the update processing program after starting execution of the boot program when the presence the update is stored in the storage unit, and upon completing an update of the update program, executes the basic program so as to perform relay processing.

2. The on-board device according to claim 1,
   wherein the plurality of programs include the control program and a diagnostic program to be executed on the basic program,
   the diagnostic program includes an input/output function that is different from the input/output function included in the basic program,
   the processing unit executing the control program controls relay with a plurality of on-board ECUs connected by communication, and
   the processing unit executing the diagnostic program acquires the information relevant to the presence or absence of the update that is provided, and stores the acquired information relevant to the presence or absence of the update in the sharing area by the input/output function that is different from the input/output function included in the basic program.

3. The on-board device according to claim 2, wherein the processing unit designates the sharing area by a physical address indicating a physical storage position in the storage unit, and stores the information relevant to the presence or absence of the update in the designated sharing area.

4. The on-board device according to claim 2, wherein the sharing area is accessible by executing the update processing program, and
   when update processing is completed, the processing unit executing the update processing program stores information indicating that the update processing is completed in the sharing area.

5. The on-board device according to claim 1, wherein the processing unit designates the sharing area by a physical address indicating a physical storage position in the storage unit, and stores the information relevant to the presence or absence of the update in the designated sharing area.

6. The on-board device according to claim 5, wherein the sharing area is accessible by executing the update processing program, and
   when update processing is completed, the processing unit executing the update processing program stores information indicating that the update processing is completed in the sharing area.

7. The on-board device according to claim 1, wherein the sharing area is accessible by executing the update processing program, and
   when update processing is completed, the processing unit executing the update processing program stores information indicating that the update processing is completed in the sharing area.

8. An information processing method for relaying information between a plurality of electronic control units, comprising:
   boot processing to be executed when activated;
   basic processing to be selectively executed by the boot processing, the basic processing includes relaying information between the plurality of electronic control units; and
   update processing to be selectively executed by the boot processing to perform communication of information relevant to update,
   a sharing area for storing information relevant to the presence or absence of update of a control program of an own device is being accessible by executing the boot processing and is different from an area accessible by an input/output function included in the basic processing, the method allowing a computer to execute processing of:
   acquiring the information relevant to the presence or absence of the update that is provided;
   storing the acquired information relevant to the presence or absence of the update in the sharing area by an input/output function that is different from the input/output function included in the basic processing; and
   executing the update processing after starting execution of the boot processing when the update is stored in the sharing area, and upon completion of the update, executing the basic processing so as to relay information between the plurality of electronic control units.

9. A computer program product comprising a non-transitory, machine-readable medium storing instructions which, when executed by at least one programmable processor, causes at least one programmable processor to perform operations, comprising:
- a boot program to be executed when activated;
- a basic program to be selectively executed by the boot program, the basic processing includes relaying information between the plurality of electronic control units; and
- an update processing program to be selectively executed by the boot program to perform communication of information relevant to update,
- a sharing area for storing information relevant to the presence or absence of update of a control program of an own device is being accessible by executing the boot program and is different from an area accessible by an input/output function included in the basic program, the program allowing a computer to execute processing of:
- acquiring the information relevant to the presence or absence of the update that is provided;
- storing the acquired information relevant to the presence or absence of the update in the sharing area by an input/output function that is different from the input/output function included in the basic program; and
- executing the update processing program after starting execution of the boot program when the update is stored in the sharing area, and upon completion of the update, executing the basic processing so as to relay information between the plurality of electronic control units.

* * * * *